United States Patent
Ho et al.

(10) Patent No.: US 12,368,349 B2
(45) Date of Patent: Jul. 22, 2025

(54) COMPOSITE TWO-PHASE FLUID COOLING MOTOR AND COMPOSITE TWO-PHASE FLUID COOLING DEVICE THEREOF

(71) Applicant: TECO Electric & Machinery Co., Ltd., Taipei (TW)

(72) Inventors: Kwun-Yao Ho, Taipei (TW); Szu-Hsien Liu, Taipei (TW); Yao-Ching Huang, Taipei (TW); Chia-Wei Liu, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 227 days.

(21) Appl. No.: 18/332,395

(22) Filed: Jun. 9, 2023

(65) Prior Publication Data
US 2024/0322651 A1 Sep. 26, 2024

(30) Foreign Application Priority Data
Mar. 21, 2023 (TW) ................................ 112110383

(51) Int. Cl.
*H02K 9/20* (2006.01)
*H02K 5/20* (2006.01)
*H02K 9/22* (2006.01)

(52) U.S. Cl.
CPC ............... *H02K 9/20* (2013.01); *H02K 5/203* (2021.01); *H02K 9/225* (2021.01)

(58) Field of Classification Search
CPC ........... H02K 5/203; H02K 9/18; H02K 9/20; H02K 9/225
See application file for complete search history.

(56) References Cited

U.S. PATENT DOCUMENTS

| | | | |
|---|---|---|---|
| 6,617,716 B2* | 9/2003 | Ishida | H02K 9/227 310/58 |
| 9,997,985 B2* | 6/2018 | Prüssmeier | H02K 41/03 |
| 12,155,287 B2* | 11/2024 | Bienaime | H01F 7/0221 |
| 2021/0257877 A1* | 8/2021 | Hung | H02K 5/18 |

* cited by examiner

*Primary Examiner* — Naishadh N Desai
(74) *Attorney, Agent, or Firm* — Muncy, Geissler, Olds & Lowe, P.C.

(57) ABSTRACT

A cooling motor includes a motor device having a motor casing, a motor assembly arranged in the motor casing, and a centrifugal fan, and a cooling device having first and second cooling components. The first cooling component includes a first cold plate jacket and a first heat circulation pipeline. The first cold plate jacket is sleeved on the motor assembly and thermally connected to a stator, and the first cold plate jacket includes first cold plates. The first thermal circulation pipeline filled with a first working fluid passes through the first cold plate jacket. The second cooling component includes a second cold plate jacket and a second heat circulation pipeline. The second cold plate jacket, sleeving the first cold plate jacket in an insulation manner, includes second cold plates and cooling fins. The second thermal circulation pipeline filled with a second working fluid passes through the second cold plate jacket.

9 Claims, 8 Drawing Sheets

COMPOSITE TWO-PHASE FLUID COOLING MOTOR AND COMPOSITE TWO-PHASE FLUID COOLING DEVICE THEREOF

This application claims the benefit of Taiwan Patent Application Serial No. 112110383, filed Mar. 21, 2023, the subject matter of which is incorporated herein by reference.

BACKGROUND OF THE INVENTION

(1) Field of the Invention

The invention relates to a cooling motor and a cooling device of the cooling motor, and more particularly to a composite two-phase fluid cooling motor and its cooling device.

(2) Description of the Prior Art

Generally speaking, an operation of a motor would generate lots of heat, and the generation of the heat would go higher if the working load is increased. Such heat generated during motor's operation is mainly the waste heat from the resistance loss at the stator after coils are energized. Except that the stator can generate heat, the rotor would also produce waste heat due to hysteresis loss under the interaction of the magnetic fields.

As described above, in the existing motor heat dissipation technology, air cooling, water cooling or oil cooling are usually used to dissipate heat from the stator. However, since the internal rotor is not easy to exchange heat effectively with the outside world, most of the heat can only be dissipated through the air cooling, so the heat dissipation effect is often not ideal, and thus overheating problems at the internal rotor can be expected. Thereupon, since the rotor usually meets an overheating problem, and worse may cause excessive thermal expansion to further distort gaps between bearings and other components and finally cause the motor to produce vibrations and noises.

In addition, although the stator usually has many ways to dissipate the heat, yet, as the power of the motor continues to increase, the heat dissipation becomes more and more difficult, especially in the case of high load and high speed. In the situation of a high-load and high-speed operation, not only the heat of the rotor inside the motor is hard to dissipate, and even the stator may be suffered from overheating problems due to insufficient heat dissipation. As a reasonable consequence, the stability and reliability of the motor would be affected. Therefore, developing new cooling technologies and devices has become one of important research directions.

SUMMARY OF THE INVENTION

In view of the fact that in the prior art, most of the heat dissipation technologies for the existing motors are targeted to cool the stator, and less of heat dissipation methods are applied to the rotor. Since a typical motor is usually designed to have an inner rotor and an outer stator, thus the heat dissipation upon the inner rotor can only be achieved through the air cooling, and the corresponding heat dissipation efficiency is usually not satisfied. As the power demand of the motor is increasing, the existing heat dissipation technology is no longer sufficient to meet the heat dissipation demand of the current motor. Accordingly, it is an object of the present invention to provide a composite two-phase fluid cooling motor and a cooling device thereof to utilize the phase change of a two-phase fluid for helping the rotor and the stator of the motor to enhance the corresponding heat dissipation.

In this present invention, a composite two-phase fluid cooling motor includes a motor device and a composite two-phase fluid cooling device.

The motor device includes a motor casing, a motor assembly and a centrifugal fan. The motor assembly, disposed inside the motor casing, includes a stator frame, a stator, a rotor and a rotational shaft.

The stator is disposed in the stator frame. The rotor, rotationally disposed in the stator, is spaced from the stator by a spacing. The rotational shaft penetrates and is also fixed to the rotor. The centrifugal fan is disposed inside the motor casing by being fixed to the rotational shaft so as to be rotated thereby.

The composite two-phase fluid cooling device includes a first two-phase circulation cooling component and a second two-phase circulation cooling component. The first two-phase circulation cooling component includes a first cold plate jacket and a first heat circulation pipeline. The first cold plate jacket, disposed inside the motor casing, sleeves the motor assembly to thermally connect the stator. The first cold plate jacket includes a plurality of first cold plates linked to each other. The first heat circulation pipeline penetrates the first cold plate jacket, and is filled with a first working fluid.

The second two-phase circulation cooling component includes a second cold plate jacket and a second heat circulation pipeline. The second cold plate jacket is disposed inside the motor casing, is thermally insulated to sleeve the first cold plate jacket, and includes a plurality of second cold plates linked to each other. Each of the plurality of second cold plates has a plurality of cooling fins to define a plurality of cooling runners thereinside with the motor casing. The second heat circulation pipeline penetrates the second cold plate jacket, and is filled with a second working fluid.

In this invention, when the centrifugal fan rotates, a cooling air is induced inside the motor casing to circulate around the plurality of cooling runners and the spacing.

In one embodiment of this invention, the motor device further includes a wind-guide shield connected with the stator frame, the wind-guide shield and the motor casing together define thereinside a radial outlet connected spatially with the spacing inside the motor casing, and the centrifugal fan is to transmit the cooling air from the spacing to the plurality of cooling runners via the radial outlet.

In one embodiment of this invention, when the motor assembly is operated in one of a plurality of allowed operating statuses, the stator has a first temperature variation range, the cooling air has a second temperature variation range, a first boiling temperature of the first working fluid is within the first temperature variation range, and a second boiling temperature of the second working fluid is within the second temperature variation range. Preferably, the first temperature variation range is a range of 75° C.-90° C., and the second temperature variation range is a range of 50° C.-65° C.

In another aspect of this invention, a composite two-phase fluid cooling device is applied to a motor device having a motor casing, a motor assembly and a centrifugal fan. The composite two-phase fluid cooling device includes a first two-phase circulation cooling component and a second two-phase circulation cooling component.

The first two-phase circulation cooling component includes a first cold plate jacket and a first heat circulation pipeline. The first cold plate jacket, disposed inside the motor casing, sleeves the motor assembly to thermally connect a stator. The first cold plate jacket includes a plurality of first cold plates linked to each other. The first heat circulation pipeline penetrates the first cold plate jacket, and is filled with a first working fluid.

The second two-phase circulation cooling component includes a second cold plate jacket and a second heat circulation pipeline. The second cold plate jacket, disposed inside the motor casing, is thermally insulated to sleeve the first cold plate jacket, and includes a plurality of second cold plates linked to each other. Each of the plurality of second cold plates has a plurality of cooling fins to define a plurality of cooling runners thereinside with the motor casing. The second heat circulation pipeline penetrates the second cold plate jacket, and is filled with a second working fluid.

When the centrifugal fan rotates, a cooling air is induced inside the motor casing to circulate around the plurality of cooling runners and the spacing.

In one embodiment of this invention, when the motor assembly is operated in one of a plurality of allowed operating statuses, the stator has a first temperature variation range, the cooling air has a second temperature variation range, a first boiling temperature of the first working fluid is within the first temperature variation range, and a second boiling temperature of the second working fluid is within the second temperature variation range. Preferably, the first temperature variation range is a range of 75° C.-90° C., and the second temperature variation range is a range of 50° C.-65° C.

As stated, this invention utilizes mainly the first two-phase circulation cooling component to absorb the heat of the stator through direct thermal connections, and further utilizes the phase change of the first working fluid to dissipate the heat of the stator. In addition, the second two-phase circulation cooling component is also utilized to absorb the heat of the rotor and stator through the cooling air induced by the centrifugal fan, and further utilizes the phase change of the second working fluid to dissipate the heat of the stator and also the rotor.

All these objects are achieved by the composite two-phase fluid cooling motor and the composite two-phase fluid cooling device thereof described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a composite two-phase fluid cooling motor and a composite two-phase fluid cooling device thereof. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
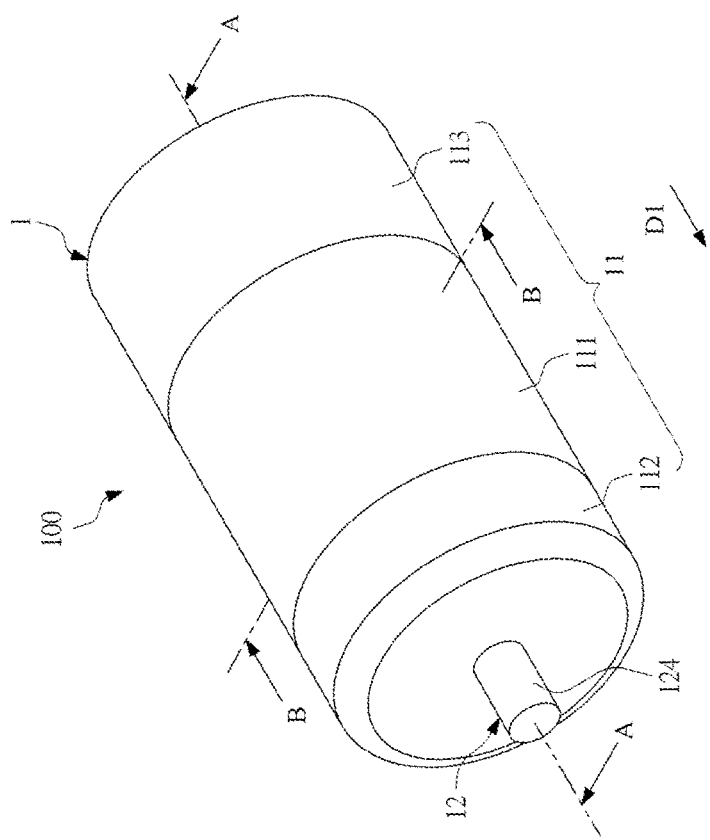
FIG. 1 is a schematic perspective view of a preferred embodiment of the composite two-phase fluid cooling motor in accordance with the present invention.
Figure 2:
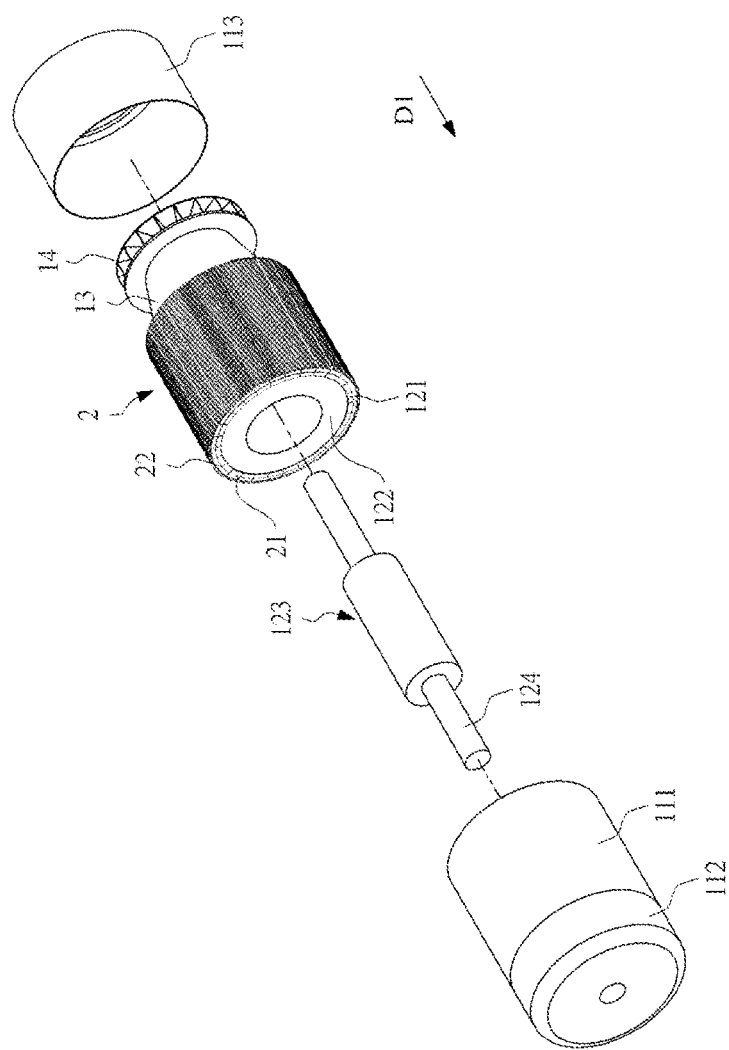
FIG. 2 is a schematic exploded view of FIG. 1.
Figure 3:
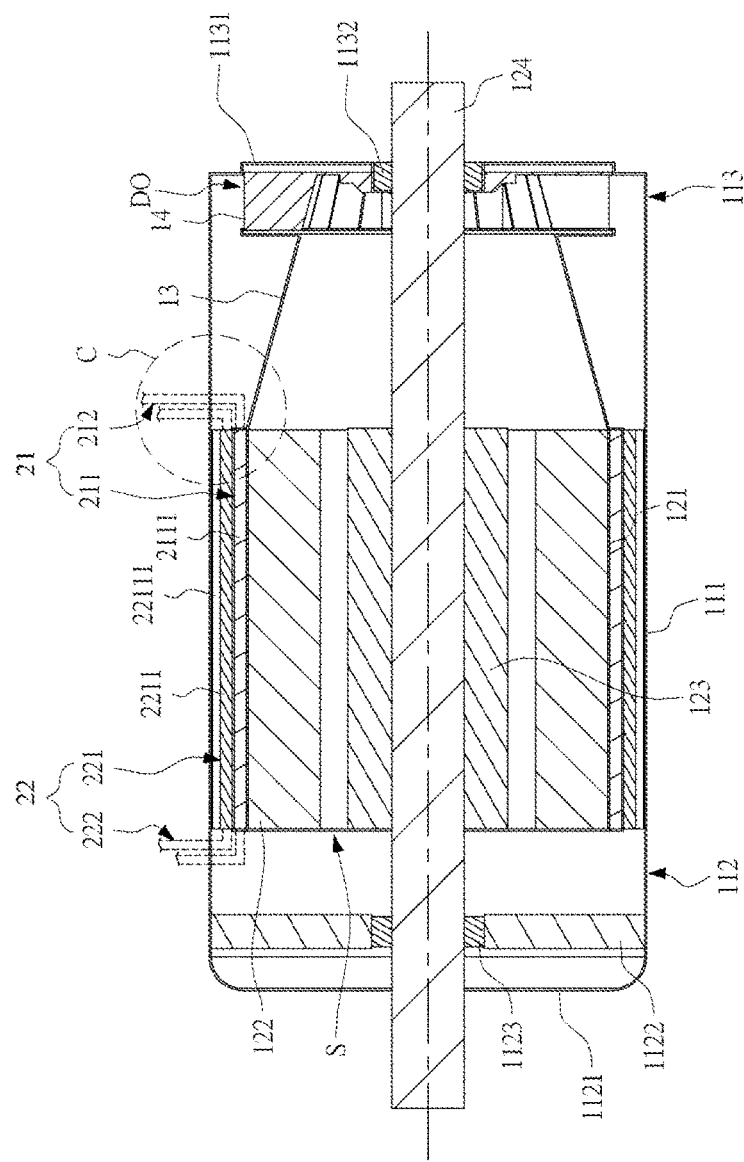
FIG. 3 is a schematic cross-sectional view of FIG. 1 along line A-A.

Refer to FIG. 1 to FIG. 3; where FIG. 1 is a schematic perspective view of a preferred embodiment of the composite two-phase fluid cooling motor in accordance with the present invention, FIG. 2 is a schematic exploded view of FIG. 1, and FIG. 3 is a schematic cross-sectional view of FIG. 1 along line A-A.

As shown in FIG. 1 to FIG. 3, a composite two-phase fluid cooling motor 100 includes a motor device 1 and a composite two-phase fluid cooling device 2. The motor device 1 includes a motor casing 11, a motor assembly 12, a wind-guide shield 13 and a centrifugal fan 14.

The motor casing 11 includes a shell body 111, a first end portion 112 and a second end portion 113. The first end portion 112 and the second end portion 113 are disposed to opposite sides of the shell body 111. The first end portion 112 includes a first end cover body 1121, an end plate 1122 and a bearing 1123. The first end cover body 1121 is fixed to the shell body 111, the end plate 1122 is disposed inside the first end cover body 1121, and the bearing 1123 is disposed at a center of the end plate 1122. On the other hand, the second end portion 113 includes a second end cover body 1131 and a bearing 1132. The second end cover body 1131 is fixed to an end of the shell body 111 opposite to the first end cover body 1121, while the bearing 1132 is disposed at a center of the second end cover body 1131.

The motor assembly 12 includes a stator frame 121, a stator 122, a rotor 123 and a rotational shaft 124.

The stator frame 121 is disposed inside the motor casing 11. The stator 122 is disposed inside the stator frame 121, and thermally connected to an inner wall of the stator frame 121. In this embodiment, the stator 122 is installed inside the stator frame 121 by directly fitting the inner wall of the stator frame 121, and thus the stator 122 and the stator frame 121 can be thermally connected.

The rotor 123 is rotationally disposed inside the stator 122, and is spaced from the stator 122 by a spacing S. The rotational shaft 124 penetrates through and is also fixed to the rotor 123, with two opposite ends of the rotational shaft 124 rotationally fixed to the first end portion 112 and the second end portion 113, respectively. Namely, the rotational shaft 124 is extended in a first direction D1, and is rotational with respect to both the bearings 1123 and 1132.

The wind-guide shield 13 is connected with the stator frame 121, and defines thereinside a radial outlet DO inside the second end portion 113 connected spatially with the spacing S by integrating the second end portion 113. The centrifugal fan 14 is disposed in the second end portion 113, fixed to the rotational shaft 124, and located in correspondence to the radial outlet DO.

Figure 4:
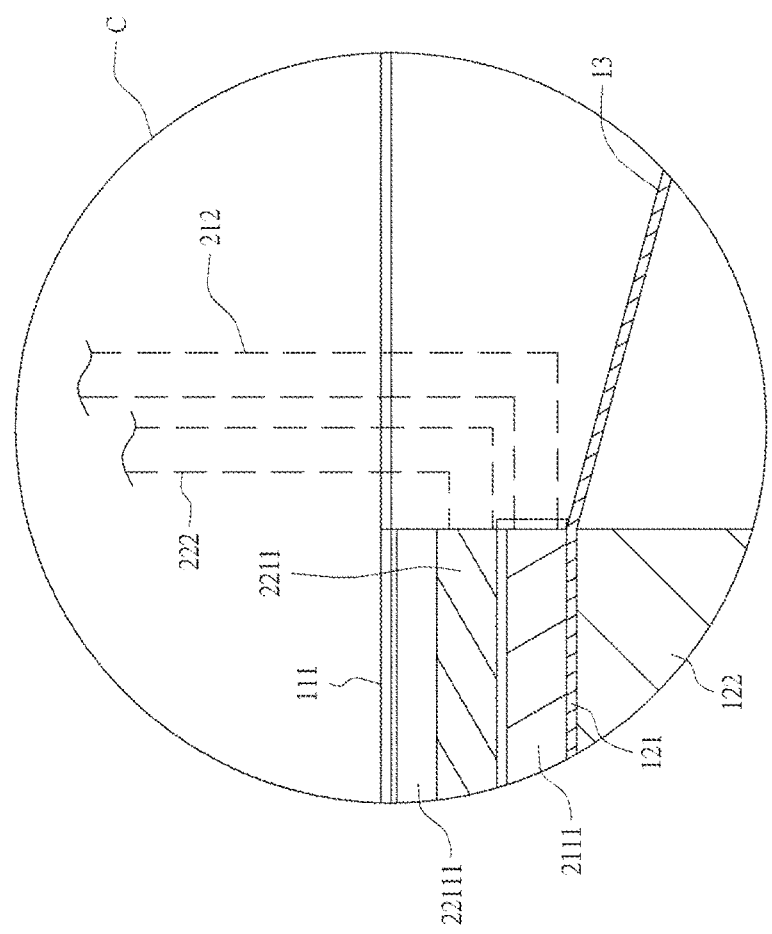
FIG. 4 is a schematic enlarged view of circle C of FIG. 3.
Figure 5:
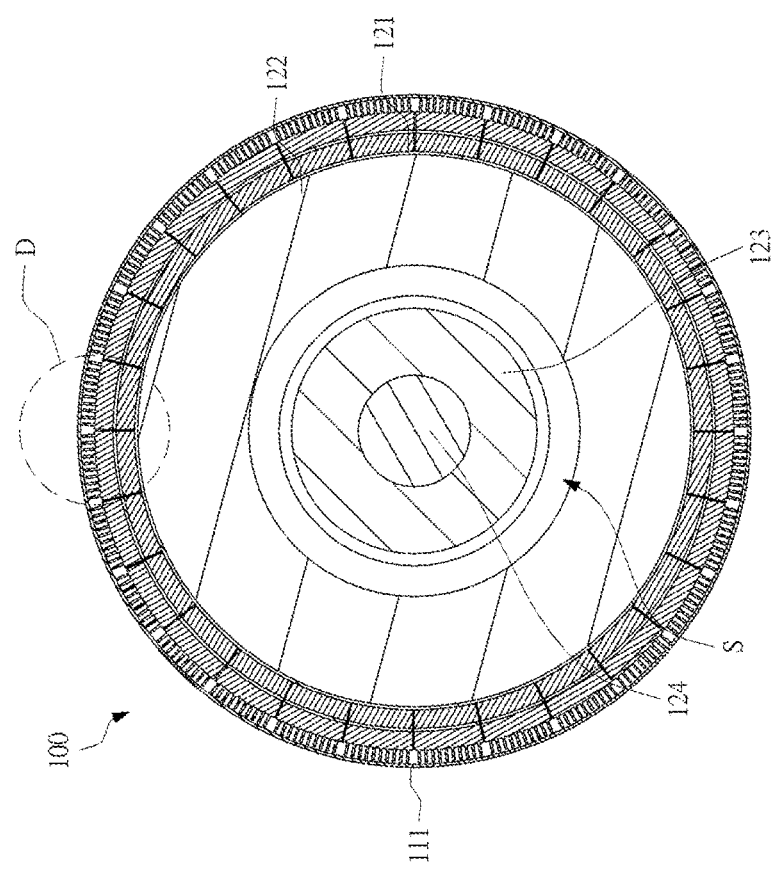
FIG. 5 is a schematic cross-sectional view of FIG. 1 along line B-B.
Figure 6:
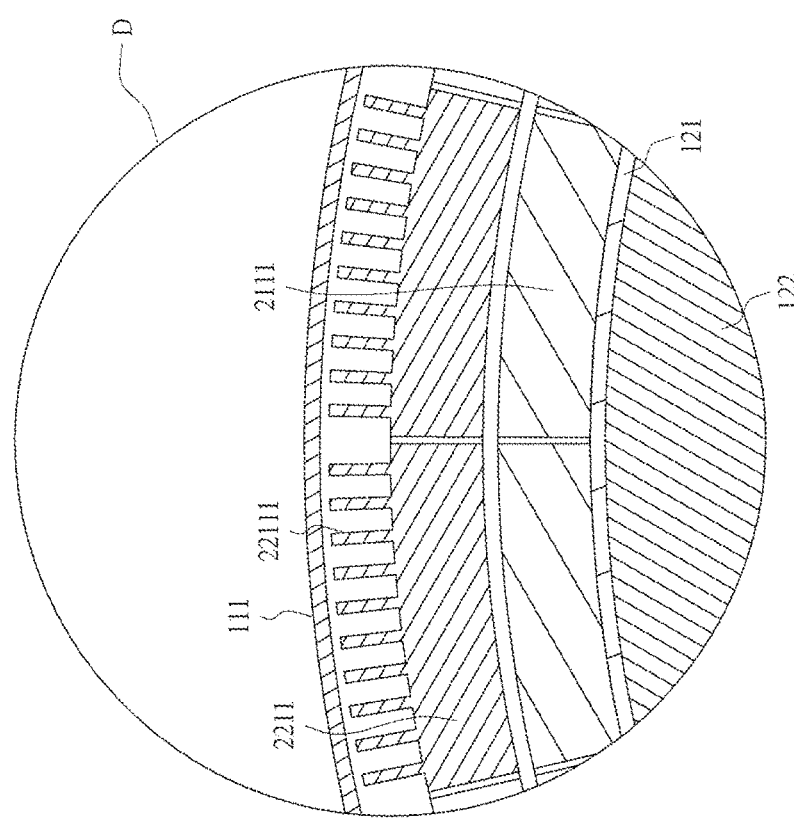
FIG. 6 is a schematic enlarged view of circle D of FIG. 5.

Refer to FIG. 4 to FIG. 6; where FIG. 4 is a schematic enlarged view of circle C of FIG. 3, FIG. 5 is a schematic cross-sectional view of FIG. 1 along line B-B, and FIG. 6 is a schematic enlarged view of circle D of FIG. 5.

As shown in FIG. 1 through FIG. 6, the composite two-phase fluid cooling device 2 includes a first two-phase circulation cooling component 21 and a second two-phase circulation cooling component 22. The first two-phase circulation cooling component 21 includes a first cold plate jacket 211 and a first heat circulation pipeline 212. The first cold plate jacket 211 is disposed inside the motor casing 11 by sleeving the motor assembly 12, and thus the first cold plate jacket 211 and the stator 122 are thermally connected. In addition, the first cold plate jacket 211 includes a plurality of first cold plates 2111 (one labeled only in the figure) linked to each other. Since the stator 122 is disposed inside the stator frame 121, thus the first cold plates 2111 are thermally connected with the stator 122 through the stator frame 121. Thereupon, the heat generated by the stator 122 in operation can be transferred to the first cold plate 2111 via the stator frame 121.

The first heat circulation pipeline 212 penetrates through the first cold plate jacket 211, and is filled with a first working fluid. In this invention, the first working fluid can be a refrigerant with high latent heat such as water, ethanol or ethylene glycol. It shall be explained that, in this embodiment, the plurality of first cold plates 2111 can be properly connected to each other at ends thereof so as to form an extended pipe consisted of all the first cold plates 2111 connected in series, such that the first heat circulation pipeline 212 can penetrate through the entire first cold plate jacket 211, and transport the internal fluid thereinside (i.e., the first working fluid) out of the range of the first cold plate jacket 211 for heat dissipation firstly and then back into the first cold plate jacket 211 for the first working fluid to heat exchange with the first cold plate jacket repeatedly. However, in another embodiment, the first heat circulation pipeline 212 can have the first cold plates 2111 to be connected together in a parallel manner.

The second two-phase circulation cooling component 22 includes a second cold plate jacket 221 and a second heat circulation pipeline 222. The second cold plate jacket 221 is disposed inside the motor casing 11, and thermally insulated to sleeve the first cold plate jacket 211. The second cold plate jacket 221 includes a plurality of second cold plates 2211 (one labeled only in the figure) linked to each other. Each of the second cold plates 2211 further has a plurality of cooling fins 22111 (one labeled only in the figure), and the cooling fin 22111 defines a plurality of cooling runners (not labeled in the figure) with the shell body 111. In this invention, thermal insulation between the outer second cold plate jacket 221 and the inner first cold plate jacket 211 can be achieved by an interval arrangement, or by filled with a thermal insulation material or even a vacuum in between.

The second heat circulation pipeline 222 penetrates through the second cold plate jacket 221, and is filled with a second working fluid. The second working fluid can be a refrigerant with high latent heat such as water, ethanol or ethylene glycol. It shall be explained that, in this embodiment, the plurality of second cold plates 2211 can be properly connected to each other at ends thereof so as to form an extended pipe consisted of all the second cold plates 2211 connected in series, such that the second heat circulation pipeline 222 can penetrate through the entire second cold plate jacket 221, and transport the internal fluid thereinside (i.e., the second working fluid) out of the range of the second cold plate jacket 221 for heat dissipation firstly and then back into the second cold plate jacket 221 for the second working fluid to heat exchange with the second cold plate jacket repeatedly. However, in another embodiment, the second heat circulation pipeline 222 can have the second cold plates 2211 to be connected together in a parallel manner.

Figure 7:
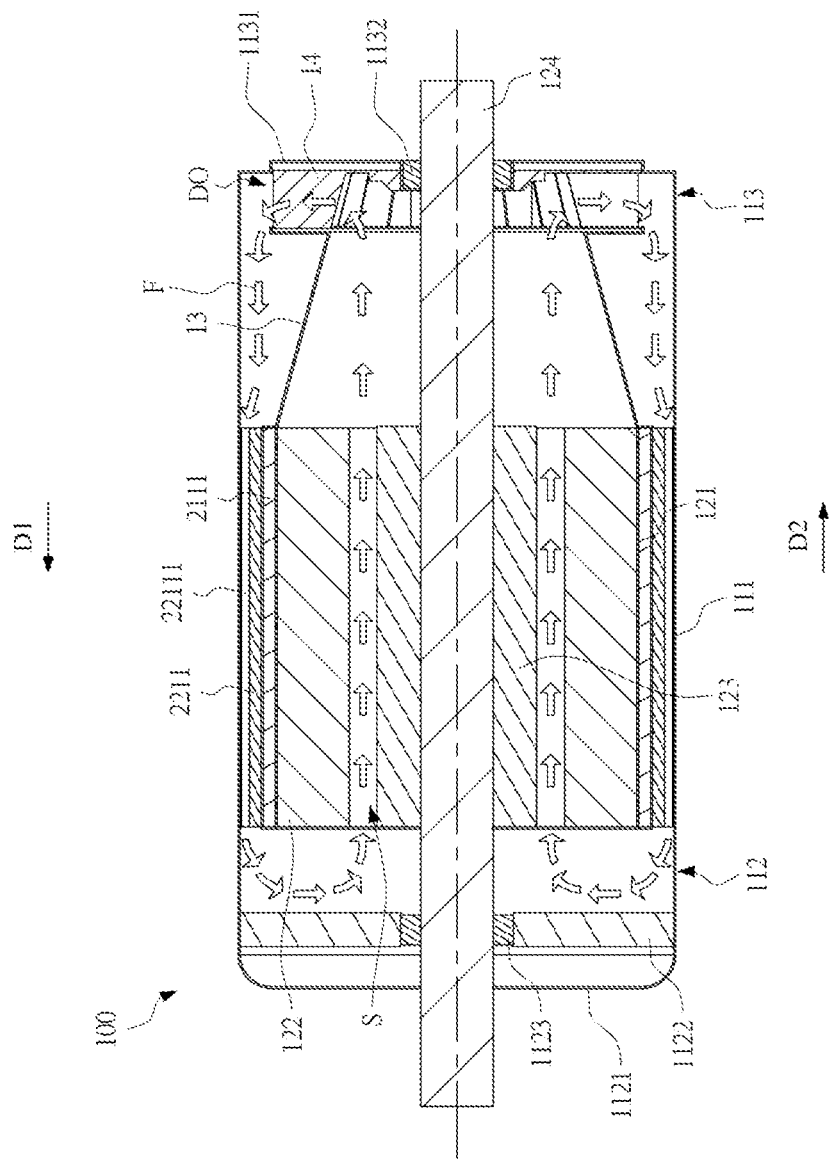
FIG. 7 illustrates schematically a cooling air flow for the composite two-phase fluid cooling motor of FIG. 1 produced by the centrifugal fan.

Referring to FIG. 7, a cooling air flow for the composite two-phase fluid cooling motor of FIG. 1 produced by the centrifugal fan is illustrated schematically. As shown in FIG. 1 to FIG. 7, when the centrifugal fan 14 is rotated, since the centrifugal fan 14 is connected spatially with the spacing S, thus the air in the spacing S would be driven to form a cooling air F flowing toward a radial outlet DO. Since the motor casing 11 forms thereinside an airtight space, thus the cooling air F would flow along the inner wall of the second end cover body 1131, in a first direction D1, to pass through the plurality of cooling runners (not labeled in the figure) defined by the cooling fins 22111 and the shell body 111, then flow back to the spacing S via the first end portion 112 by passing the spacing S in a second direction D2 reverse to the first direction D1, and finally be drawn out to circulate inside the motor casing 11 by the centrifugal fan 14. When the cooling air F passes the spacing S, part of the heat of the cooling air F would be transferred to the rotor 123 and the stator 122. Also, when the cooling air F passes the cooling runners, part of the heat of the cooling air F would be transferred to the cooling fins 22111, and further to be absorbed by the second working fluid inside the second cold plate jacket 221.

It shall be explained that, while the motor assembly 12 is operated in any of a plurality of allowed operating statuses, the stator 122 would have a first temperature variation range, and the cooling air F would have a second temperature variation range. In particular, a first boiling temperature of the first working fluid would be within the first temperature variation range, and a second boiling temperature of the second working fluid would be within the second temperature variation range. Thereupon, phase changes at the first working fluid and the second working fluid can be well utilized to perform the corresponding heat exchange effectively, and thus the heat-dissipation performance of the stator 122 and rotor 123 can be significantly enhanced. In this embodiment, the first temperature variation range can be a range of 75° C.-90° C., and the second temperature variation range can be a range of 50° C.-65° C. Preferably, the first temperature variation range is a range of 75° C.-85° C., and the second temperature variation range is a range of 55° C.-65° C.

Figure 8:
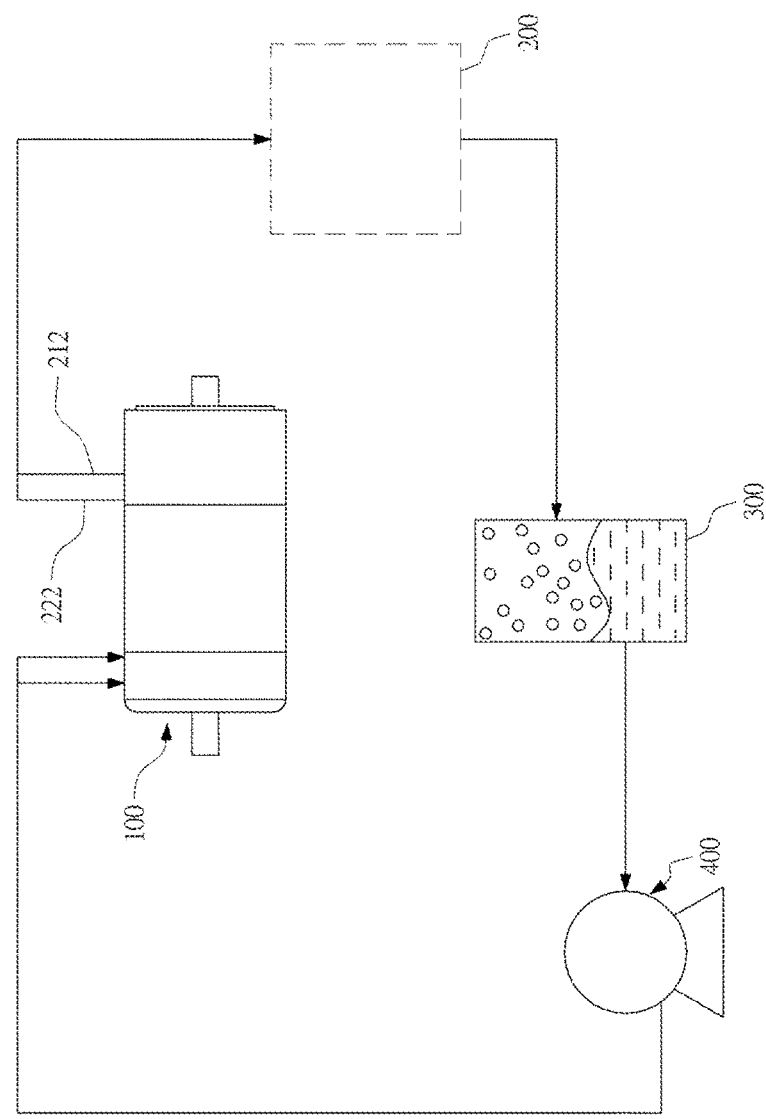
FIG. 8 demonstrates schematically a system that applies the composite two-phase fluid cooling motor of this invention to perform a cooling cycle.

Referring to FIG. 8, a system that applies the composite two-phase fluid cooling motor of this invention to perform a cooling cycle is demonstrated schematically. As shown in FIG. 1 to FIG. 8, when the first working fluid is flowed out from the first heat circulation pipeline 212, and the second working fluid is flowed out from the second heat circulation pipeline 222, since the first heat circulation pipeline 212 and the second heat circulation pipeline 222 are collected to the same condenser 200, thus the first working fluid and the second working fluid would be condensed into a liquid-state fluid in the condenser 200 to be further collected by a liquid reservoir 300. Then, a pump 400 would send the liquid-state first working fluid and second working fluid in the liquid reservoir 300 back to the composite two-phase fluid cooling motor 100, such that the first working fluid and the second working fluid can circulate in the first heat circulation pipeline 212 and the second heat circulation pipeline 222, respectively, to execute corresponding heat exchange with the stator 122 and the rotor 123, respectively. In this embodiment, the condenser 200 can be a cooling tower, but not limited thereto.

As described above, in this embodiment, the first heat circulation pipeline 212 and the second heat circulation pipeline 222 are individually to pass through the entire pipe system consisted of the composite two-phase fluid cooling motor 100, the condenser 200, the liquid reservoir 300 and the pump 400. Since the first working fluid and the second working fluid can be both water, thus the first heat circulation pipeline 212 and the second heat circulation pipeline 222 can be collected to the same condenser 200, liquid reservoir 300 and pump 400 outside the composite two-phase fluid cooling motor 100. However, in some other embodiments, since the first heat circulation pipeline 212 and the second heat circulation pipeline 222 cane be independently constructed out of the composite two-phase fluid cooling motor 100, thus the first heat circulation pipeline 212 and the second heat circulation pipeline 222 can be used to flow different working fluids. For example, the first working fluid can be water, while the second working fluid can be ethylene glycol.

In addition, in this embodiment, though both the first working fluid and the second working fluid are water having a fixed boiling temperature of 100° C. in the normal atmosphere (1 atm), yet practically the boiling temperature of water can be lowered by reducing the vapor pressure inside the first heat circulation pipeline 212 or the second heat circulation pipeline 222 so as to adjust the boiling temperature into the aforesaid first temperature variation range and second temperature variation range. In the art, resorts to adjust the vapor pressure can be controlled by the condenser and the pump disposed along the first heat circulation pipeline 212, or by valves disposed at an entrance of the composite two-phase fluid cooling motor 100 for connecting the first heat circulation pipeline 212 and the second heat circulation pipeline 222.

To sum up, the composite two-phase fluid cooling motor and the composite two-phase fluid cooling device thereof provided in this invention are to utilize mainly the phase change of the working fluid(s) to dissipate the rotor and the stator, such that the heat generated at the stator and the rotor can be effectively transferred to the outside world. In comparison to the conventional heat-dissipating methods, the heat-dissipating performance at the motor by the arrangement provided in this invention can be effectively enhanced. In addition, since this invention introduces cold plates to work with the cooling fins for exchanging heat with the cooling air of the internal circulation, thus the volume of the entire composite two-phase fluid cooling motor can be reduced, and also the volume of the foreign condenser can be reduced as well.

While the present invention has been particularly shown and described with reference to a preferred embodiment, it will be understood by those skilled in the art that various changes in form and detail may be without departing from the spirit and scope of the present invention.

What is claimed is:

1. A composite two-phase fluid cooling motor, comprising:
   a motor device, including:
   a motor casing;
   a motor assembly, disposed inside the motor casing, including:
   a stator frame;
   a stator, disposed in the stator frame;
   a rotor, rotationally disposed in the stator, spaced from the stator by a spacing; and
   a rotational shaft, penetrating and being fixed to the rotor; and
   a centrifugal fan, disposed inside the motor casing by being fixed to the rotational shaft so as to be rotated thereby; and
   a composite two-phase fluid cooling device, including:
   a first two-phase circulation cooling component, including:
   a first cold plate jacket, disposed inside the motor casing, sleeving the motor assembly to thermally connect the stator, including a plurality of first cold plates linked to each other; and
   a first heat circulation pipeline, penetrating the first cold plate jacket, filled with a first working fluid; and
   a second two-phase circulation cooling component, including:
   a second cold plate jacket, disposed inside the motor casing, thermally insulated to sleeve the first cold plate jacket, including a plurality of second cold plates linked to each other, each of the plurality of second cold plates having a plurality of cooling fins to define a plurality of cooling runners thereinside with the motor casing; and
   a second heat circulation pipeline, penetrating the second cold plate jacket, filled with a second working fluid;
   wherein, when the centrifugal fan rotates, a cooling air is induced inside the motor casing to circulate around the plurality of cooling runners and the spacing.

2. The composite two-phase fluid cooling motor of claim 1, wherein the motor device further includes a wind-guide shield connected with the stator frame, the wind-guide shield and the motor casing together define thereinside a radial outlet connected spatially with the spacing inside the motor casing, and the centrifugal fan is to transmit the cooling air from the spacing to the plurality of cooling runners via the radial outlet.

3. The composite two-phase fluid cooling motor of claim 1, wherein, when the motor assembly is operated in one of a plurality of allowed operating statuses, the stator has a first temperature variation range, the cooling air has a second temperature variation range, a first boiling temperature of the first working fluid is within the first temperature variation range, and a second boiling temperature of the second working fluid is within the second temperature variation range.

4. The composite two-phase fluid cooling motor of claim 3, wherein the first temperature variation range is a range of 75° C.-90° C.

5. The composite two-phase fluid cooling motor of claim 3, wherein the second temperature variation range is a range of 50° C.-65° C.

6. A composite two-phase fluid cooling device, applied to a motor device, the motor device having a motor casing, a motor assembly and a centrifugal fan, the composite two-phase fluid cooling device comprising:
   a first two-phase circulation cooling component, including:
   a first cold plate jacket, disposed inside the motor casing, sleeving the motor assembly to thermally connect a stator, including a plurality of first cold plates linked to each other; and
   a first heat circulation pipeline, penetrating the first cold plate jacket, filled with a first working fluid; and
   a second two-phase circulation cooling component, including:
   a second cold plate jacket, disposed inside the motor casing, thermally insulated to sleeve the first cold plate jacket, including a plurality of second cold plates linked to each other, each of the plurality of second cold plates having a plurality of cooling fins to define a plurality of cooling runners thereinside with the motor casing; and
   a second heat circulation pipeline, penetrating the second cold plate jacket, filled with a second working fluid;

wherein, when the centrifugal fan rotates, a cooling air is induced inside the motor casing to circulate around the plurality of cooling runners and a spacing of the motor assembly.

7. The composite two-phase fluid cooling device of claim 6, wherein, when the motor assembly is operated in one of a plurality of allowed operating statuses, the stator has a first temperature variation range, the cooling air has a second temperature variation range, a first boiling temperature of the first working fluid is within the first temperature variation range, and a second boiling temperature of the second working fluid is within the second temperature variation range.

8. The composite two-phase fluid cooling device of claim 7, wherein the first temperature variation range is a range of 75° C.-90° C.

9. The composite two-phase fluid cooling device of claim 7, wherein the second temperature variation range is a range of 50° C.-65° C.

* * * * *